United States Patent
Iwashiro

(10) Patent No.: US 7,061,710 B2
(45) Date of Patent: Jun. 13, 2006

(54) METHOD AND APPARATUS FOR POSITIONING A HEAD IN A DISK DRIVE WITH SERVO WRITING FUNCTION

(75) Inventor: Masafumi Iwashiro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/976,177

(22) Filed: Oct. 29, 2004

(65) Prior Publication Data

US 2005/0094307 A1 May 5, 2005

(30) Foreign Application Priority Data

Oct. 30, 2003 (JP) .............................. 2003-371094

(51) Int. Cl.
*G11B 5/596* (2006.01)
(52) U.S. Cl. ................................. 360/77.04
(58) Field of Classification Search ............. 360/77.04
See application file for complete search history.

(56) References Cited

U.S. PATENT DOCUMENTS

| | | |
|---|---|---|
| 5,585,976 A | 12/1996 | Pham |
| 5,659,436 A | 8/1997 | Yarmchuk et al. |
| 5,854,722 A | 12/1998 | Cunningham et al. |
| 6,411,461 B1 | 6/2002 | Szita |
| 6,487,035 B1 | 11/2002 | Liu et al. |
| 6,600,621 B1 * | 7/2003 | Yarmchuk ............ 360/75 |
| 6,608,731 B1 * | 8/2003 | Szita ................ 360/75 |

FOREIGN PATENT DOCUMENTS

| | | |
|---|---|---|
| JP | 8-212733 | 8/1996 |
| JP | 2003-188701 A | 7/2003 |

OTHER PUBLICATIONS

Australian Search Report dated Jun. 29, 2005 for Singapore Appln. No. 200406501-7.

* cited by examiner

*Primary Examiner*—Wayne Young
*Assistant Examiner*—Jason Olson
(74) *Attorney, Agent, or Firm*—Pillsbury Winthrop Shaw Pittman, LLP

(57) ABSTRACT

A disk drive includes a head positioning system having a feed forward control system to correct a RRO component. The feed forward control system has a measuring unit which feeds back the last correction value obtained from the input value of the controller and measures a RRO component generated after the correction and an FF filter which computes a correction value to correct the RRO component.

6 Claims, 4 Drawing Sheets

METHOD AND APPARATUS FOR POSITIONING A HEAD IN A DISK DRIVE WITH SERVO WRITING FUNCTION

CROSS-REFERENCE TO RELATED APPLICATIONS

This application is based upon and claims the benefit of priority from prior Japanese Patent Application No. 2003-371094, filed Oct. 30, 2003, the entire contents of which are incorporated herein by reference.

BACKGROUND OF THE INVENTION

1. Field of the Invention

The present invention generally relates to a head positioning system and, more particularly, to a head positioning system of a disk drive with a servo writing function.

2. Description of the Related Art

In general, a disk drive that represents a hard disk drive incorporates a head positioning system. The head positioning system positions a head in a target position on a disk medium (simply referred to as a disk hereinafter) based on servo data recorded on the disk.

As a servo writing method of recording servo data on a disk, there is a self-servo writing method that is executed using a mechanism incorporated into a disk drive (see Jpn. Pat. Appln. KOKAI Publication No. 8-212733, for example).

In the self-servo writing method, a head is positioned using servo data written to a disk and the next servo data is written thereto. The servo data contains position error components that are synchronized with the rotation of the disk, or repeatable run-out (referred to as RRO hereinafter). If the RRO increases, the distortion of old servo data in the radial direction of the disk affects that of subsequent servo data.

The prior art self-servo writing method described above has the technique of suppressing the increase of RRO by a correction function of inputting a correction value by feed forward (FF) (which may be referred to as FF correction hereinafter).

The correction function employs a linear filter (FF filter) operation that corresponds to the inverse function of the sensitivity function of a head positioning system. The sensitivity function of a feedback control system is a transfer function $1/(1+G)$ where G means a open-loop transfer function of the feedback control system.

In the correction function, a correction value computed by the FF filter operation is added to the input value of a controller (follow-up control element) of the head positioning system. The correction value is computed based on RRO included in position errors of the head (relative to a target position), which are sensed before the correction.

In the above correction function, however, the RRO caused after a correction value is input cannot be corrected. It is thus difficult to correct the distortion of servo data to be recorded with high precision.

BRIEF SUMMARY OF THE INVENTION

In accordance with one embodiment of the present invention, there is provided a head positioning system capable of suppressing the increase of RRO effectively and correcting the distortion of servo data with high efficiency.

The head positioning system comprises a positioning unit to position a head in a target position on a disk medium that is rotating, a unit which senses a position error of the head relative to the target position, a controller which outputs an amount of control operation of the positioning unit based on the position error, and a correction unit which computes a position error component that is synchronized with rotation of the disk medium based on an input value of the controller, computes a correction value to eliminate the position error component from the position error, and adds the correction value to the input value.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
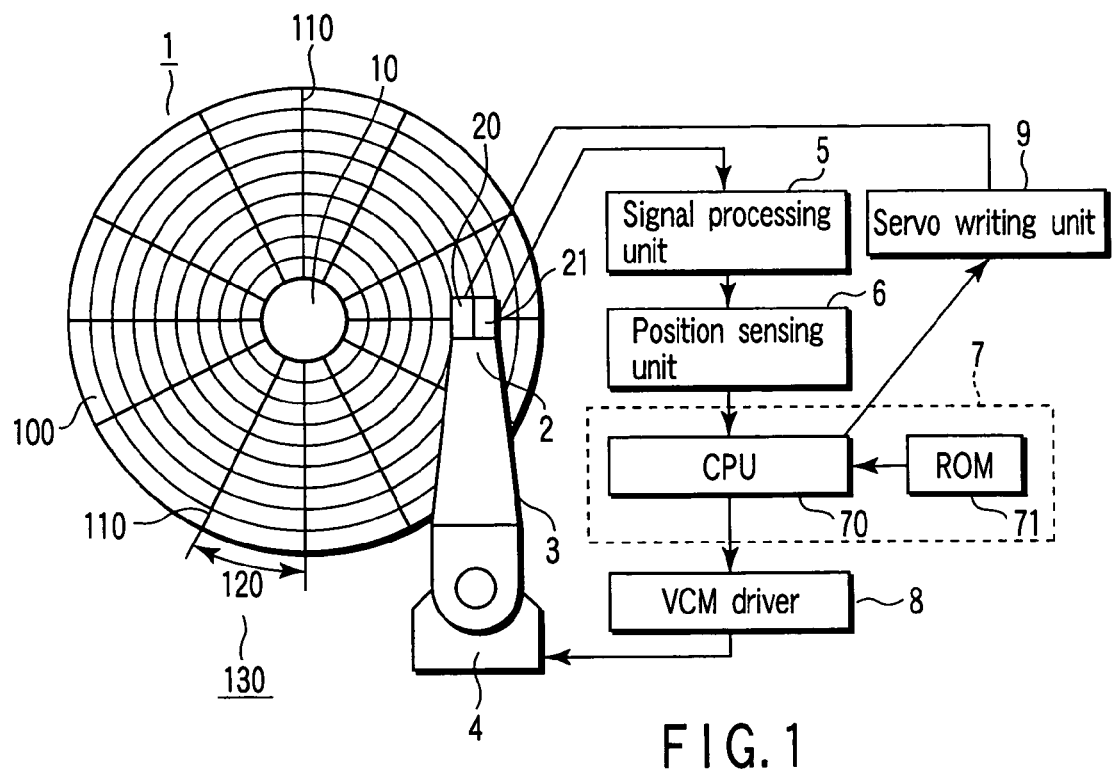
FIG. 1 is a block diagram of the main part of a disk drive according to an embodiment of the present invention.
Figure 2:
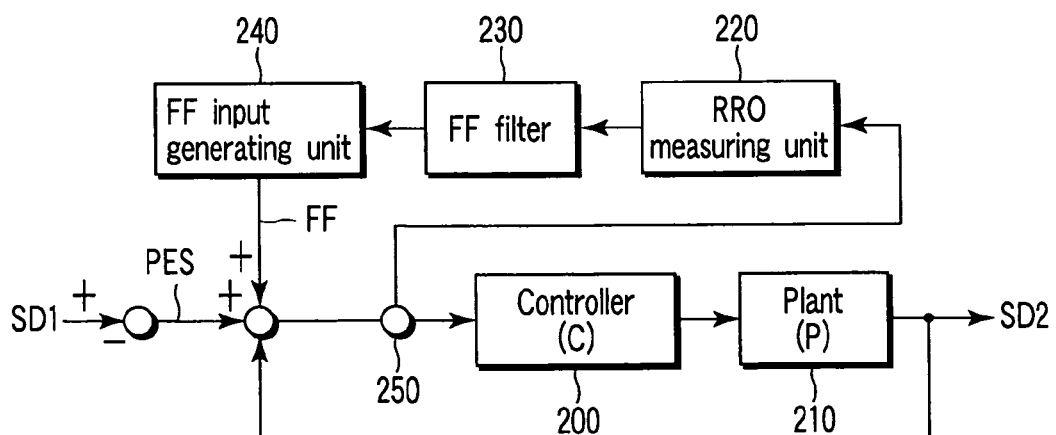
FIG. 2 is a block diagram illustrating the main part of a head positioning system of the disk drive according to the embodiment of the present invention.

FIG. 1 is a block diagram of the main part of a disk drive having a self-servo writing function. FIG. 2 is a block diagram illustrating a head positioning system incorporated into the disk drive.

(Configuration of Disk Drive)

The disk drive according to the embodiment of the present invention includes a disk 1 serving as a data recording medium, a head 2 mounted on an actuator 3, and a servo system having a self-servo writing function, as shown in FIG. 1.

The disk 1 is attached to a spindle motor (SPM) 10 and rotates at high speed. The disk 1 has a number of tracks (cylinders) 100 that are formed concentrically around the rotation axis of the disk 1. Each of the tracks 100 is divided into servo sectors 130. Each of the servo sectors 130 includes a leading servo area 110 and its subsequent data recording area 120. On the servo area 110, items of servo data (positional information) are recorded at regular intervals in the circumferential direction by a servo writing operation described later.

The head 2 includes a write head 20 and a read head 21. The write head 20 performs a write operation to write servo data or user data onto the disk 1. The read head 21 performs a read operation to read servo data or user data out of the disk 1. The actuator 3 moves the head 2 over the disk 1 in its radial direction by the driving force of a voice coil motor (VCM) 4.

The servo system includes a signal processing unit 5, a position sensing unit 6, a controller 7, a VCM driver 8 and a servo writing unit 9.

The signal processing unit 5 is a read/write channel that performs a decoding operation and an error-correcting operation for read signals output from the read head 21. The position sensing unit 6 separates servo data from the read data processed by the signal processing unit 5 to generate positional information of the head 2 (which is broadly divided into a cylinder address and a servo burst signal).

The controller 7 includes a microprocessor (CPU) 70 that serves as a main element to execute programs stored in a ROM 71 and configures a head positioning system, which will be described later. The CPU 70 computes the amount of control operation (control input value) to drive the VCM 4 in accordance with a head position sensed every fixed time period by the position sensing unit 6, control parameters stored in the ROM 71, program processing time measured by a timer, and the like.

The VCM driver 8 generates a driving current corresponding to the amount of control operation output from the CPU 70 and supplies it to the VCM 4. The servo writing unit 9 generates servo data to be recorded in the servo area 110 in response to an instruction from the CPU 70 and supplies it to the write head 20. The servo writing unit 9 achieves a self-servo writing function together with the CPU 70.

(Head Positioning Control System)

Referring to FIG. 2, the head positioning system includes a feedback control system having a controller (transfer function C) 200 as a main element and a feed forward control system for generating a correction value (FF) to eliminate RRO (position error components that are synchronized with the rotation of the disk). This system is configured by software including programs and control parameters stored in the CPU 70 and ROM 71 shown in FIG. 1.

The controller 200 receives a result of addition of a position error (PES) of a plant (target for control) 210 and a correction value (FF) (as an input value 250 to the input terminal) and performs sample value control to determine the amount of control operation for controlling the plant 210 at regular time intervals.

The plant 210 is the actuator including the head 2 in a broad sense and the VCM 4 in a narrow sense. Specifically, the VCM driver 8 converts the amount of control operation output from the controller 200 into a driving current and supplies it to the VCM 4.

The feed forward control system includes a RRO measuring unit 220, an FF filter 230 and an FF input generating unit 240.

The RRO measuring unit 220 measures an RRO residual component from the input value 250 of the controller 200. The FF filter 230 is a linear filter operating unit that is associated with the inverse function of the sensitivity function of the feedback control system, and computes correction values (FF) from the measurement results (integration values of respective servo sectors) of the RRO measuring unit 220. The FF input generating unit 240 outputs the correction value (FF) for each of the servo sectors.

(Self-Servo Writing Operation)

A self-servo writing operation according to the present embodiment will now be described with reference to FIGS. 3 to 8 as well as FIGS. 1 and 2.

Figure 8:
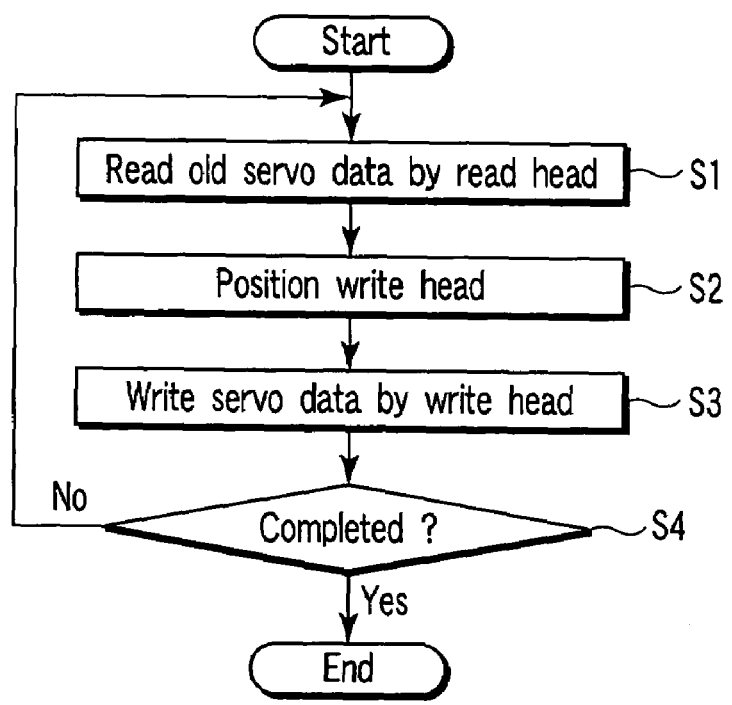
FIG. 8 is a flowchart showing a procedure of a self-servo writing operation according to the embodiment of the present invention.

First, the SPM 10 rotates the disk 1 at a constant angular velocity in the disk drive. In the self-servo writing method, the CPU 70 instructs the read head 21 to read old servo data from the disk 1 at regular time intervals, as shown in FIG. 8 (step S1). The positional information indicating the current position of the head 2 is synchronized with the rotation angle of the disk 1 and obtained from the leading servo area 110 of each of the servo sectors 130. The CPU 70 positions the write head 20 in a position to which the next servo data is written in accordance with the positional information obtained from the servo area 110 (step S2).

Referring here to FIG. 1, the write head 20 and read head 21 of the head 2 are displaced in the radial direction of the disk 1. More specifically, the write head 20 is located at the inner radius more than the read head 21.

The CPU 70 writes servo data to the servo area 110 of each servo sector of each cylinder (track) from the outer radius of the disk 1 (step S3). Then, the head 2 seeks (is positioned) for each cylinder toward the inner radius of the disk 1. The CPU 70 repeats the servo write operation to write servo data to the entire surface of the disk 1 (step S4).

When the write head 20 is located at the outer radius of the disk 1 more than the read head 21, it writes servo data from the inner radius thereof.

The positioning operation of the write head 20 in step S2 will now be described with reference to FIG. 2.

In self-servo writing operation, the CPU 70 positions the write head 20 by the head positioning control shown in FIG. 2. The controller 200 computes the amount of control operation to eliminate a position error (PES) between the position of old servo data read by the read head 21 and a position to which the next servo data is written, and supplies it to the plant 210. The result of addition of the position error (PES) and the correction value (FF) from the FF input generating unit 240 is regarded as the input value 250 of the controller 200.

The old servo data includes distortion SD1 due to RRO, while the next servo data includes distortion SD2 due to RRO. The feed forward control system computes a correction value (FF) such that the distortion SD1 has no influence on the writing of the next servo data. In other words, the correction value (FF) is computed such that the input value 250 of the controller 200 includes no RRO components.

The operation of the feed forward control system will be described below.

The RRO measuring unit 220 has memories that are equal in number to the servo sectors and measures an RRO residual component from the input value 250 of the controller 200. Specifically, the measurement is given by the following equation (1):

$$RRO(k)=RRO(k)+G\times(PES(t)+FF(k)) \quad (1)$$

where k is the number of a servo sector, RRO(k) is a result of measurement of RRO corresponding to the servo sector k, which is stored in a memory of the RRO measuring unit 220, PES(t) is a position error (PES) including the distortion of servo data, FF(k) is a correction value output from the FF input generating unit 240 and corresponding to the servo sector k, and G is a gain constant of 0 through 1, which is selected to converge the generation of a correction value (FF) stably and quickly.

In the above equation (1), RRO(k) in the right term represents a value measured when old servo data is written.

The FF filter 230 computes a correction value (FF) from the measurement result (an integration value of each of the servo sectors) stored in the memory of the RRO measuring unit 220. The FF input generating unit 240 outputs the correction value (FF) for each of the servo sectors.

As described above, the FF filter 230 included in the feed forward control system computes a correction value (FF) to correct a distortion due to RRO caused when old servo data is written. In other words, the RRO measuring unit 220 estimates a residual RRO component that corresponds to the amount of distortion due to the RRO. The FF filter 230 adds the estimated amount of distortion to the correction value (FF) to eliminate the distortion due to the RRO that was caused before the old servo data was written. Thus, the distortion SD1 caused when old servo data is written can suppress the increase of RRO that has an influence on the distortion SD2 caused when the next servo data is written. It is therefore possible to correct a distortion due to RRO in servo data recorded on the disk 1 with high precision in self-servo writing operation.

Figure 3:
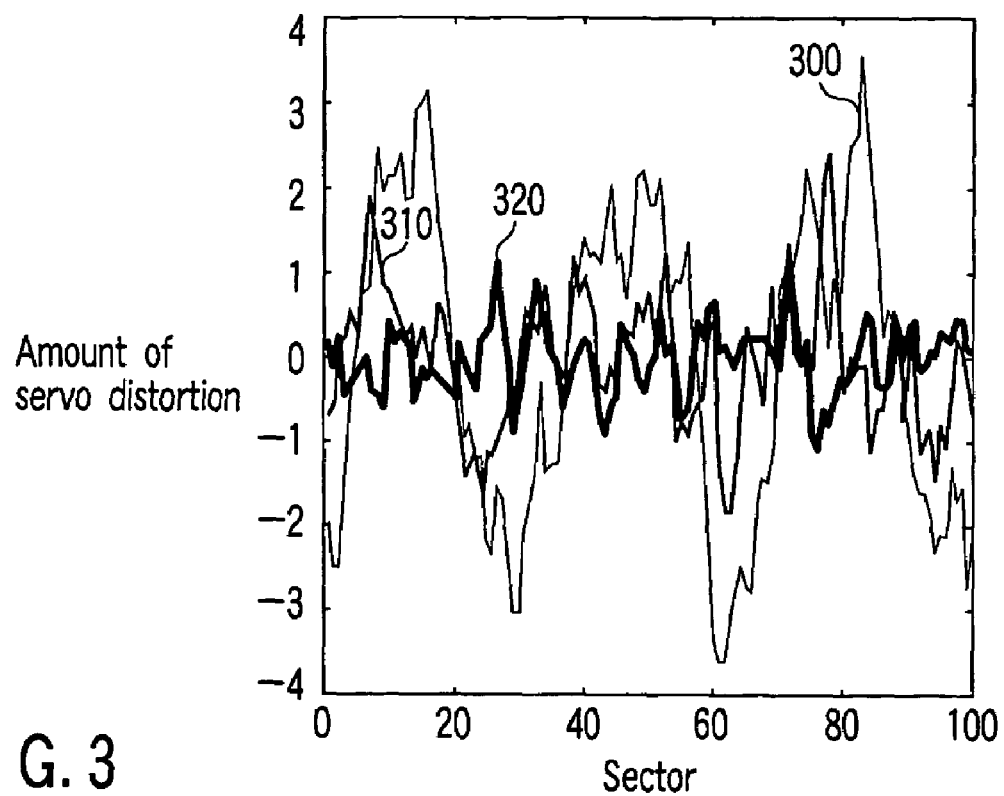
FIG. 3 is a diagram showing the amount of distortion in the head positioning system of the disk drive according to the embodiment of the present invention.

FIG. 3 shows simulation results (gain constant G is 0.3) of the amount of distortion of servo data (servo distortion amount) measured for each servo sector in self-servo writing operation using the head positioning system according to the present embodiment.

In FIG. 3, reference numeral 300 indicates the servo distortion amount at the time of writing of the preceding (old) servo data. Reference numeral 310 denotes the servo distortion amount corrected by the prior art feed forward control. Reference numeral 320 represents the servo distortion amount corrected by the feed forward control of the present embodiment.

FIGS. 4 to 7 show simulation results of time variations in the input value 250 of the controller 200 according to a change in gain constant G in the head positioning system according to the present embodiment.

Figure 4:
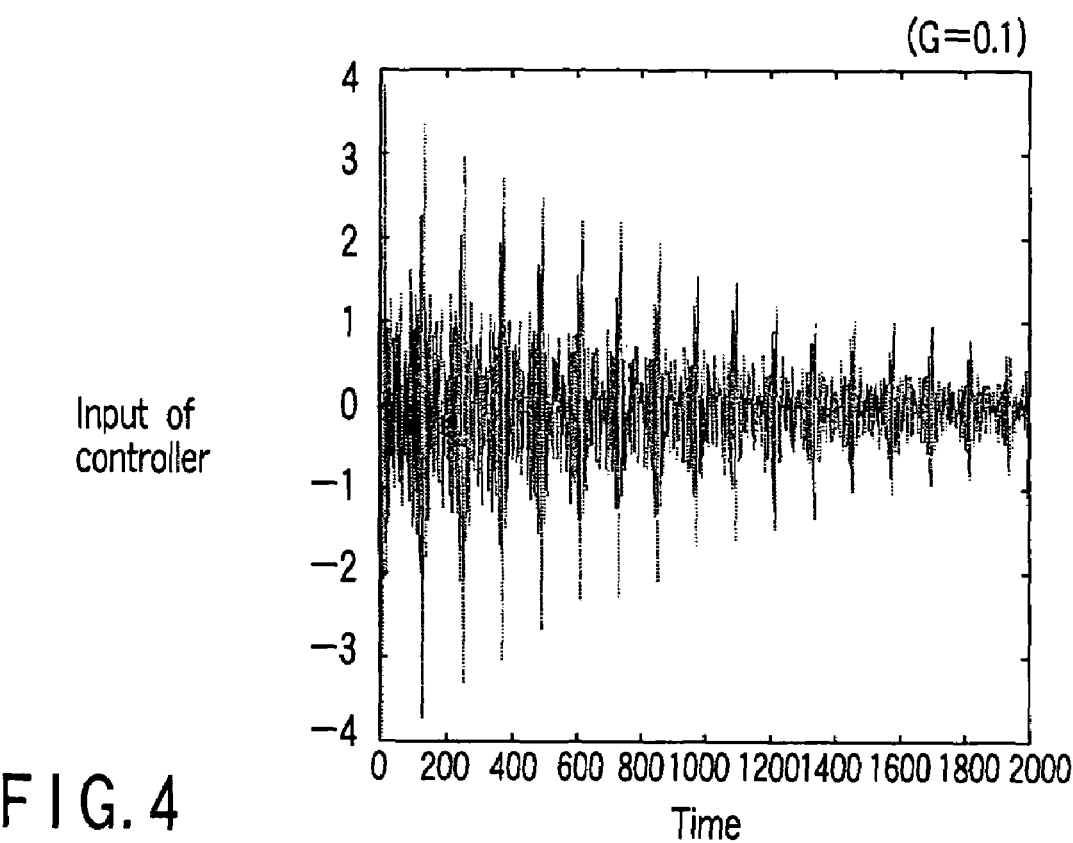
FIGS. 4 to 7 are diagrams of variations of input values of a controller of the head positioning system of the disk drive according to the embodiment of the present invention.
Figure 5:
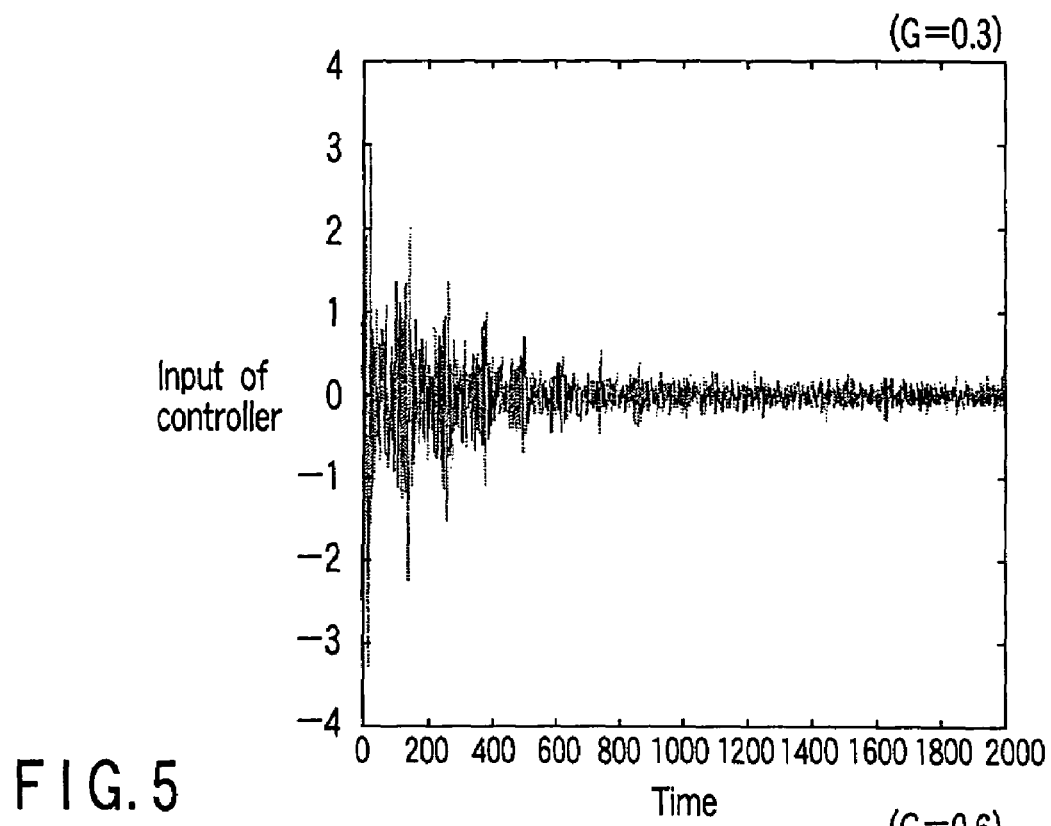
Figure 6:
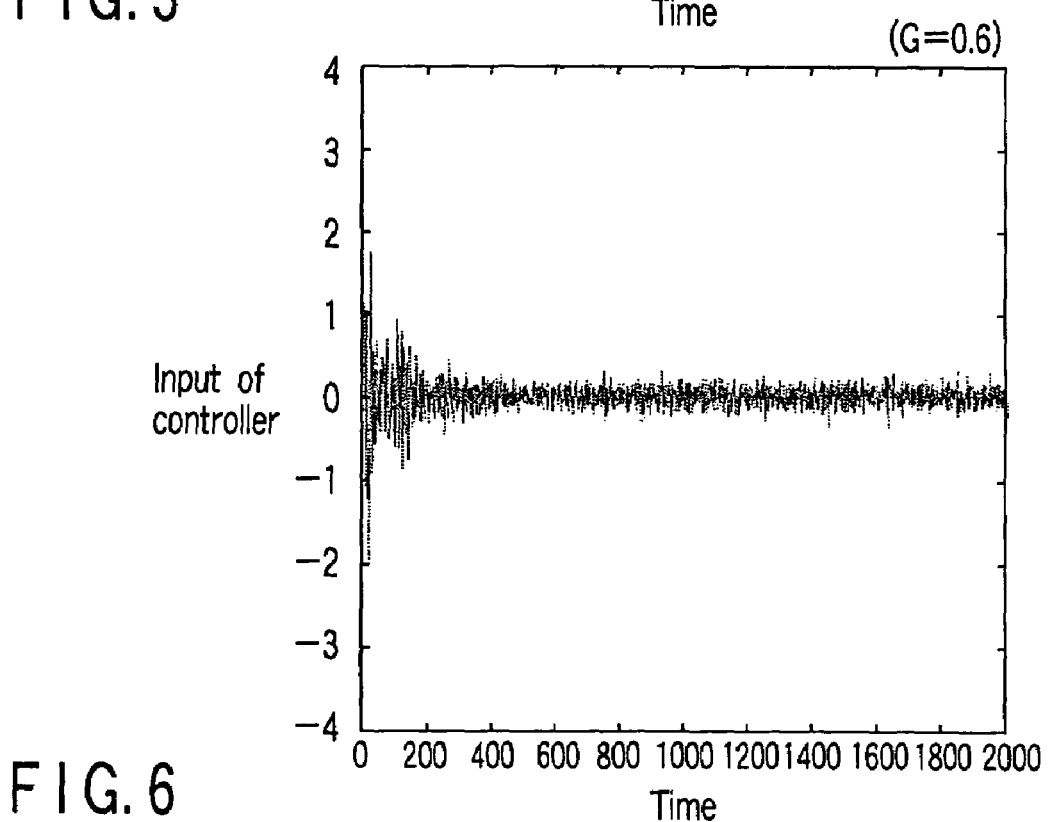
Figure 7:
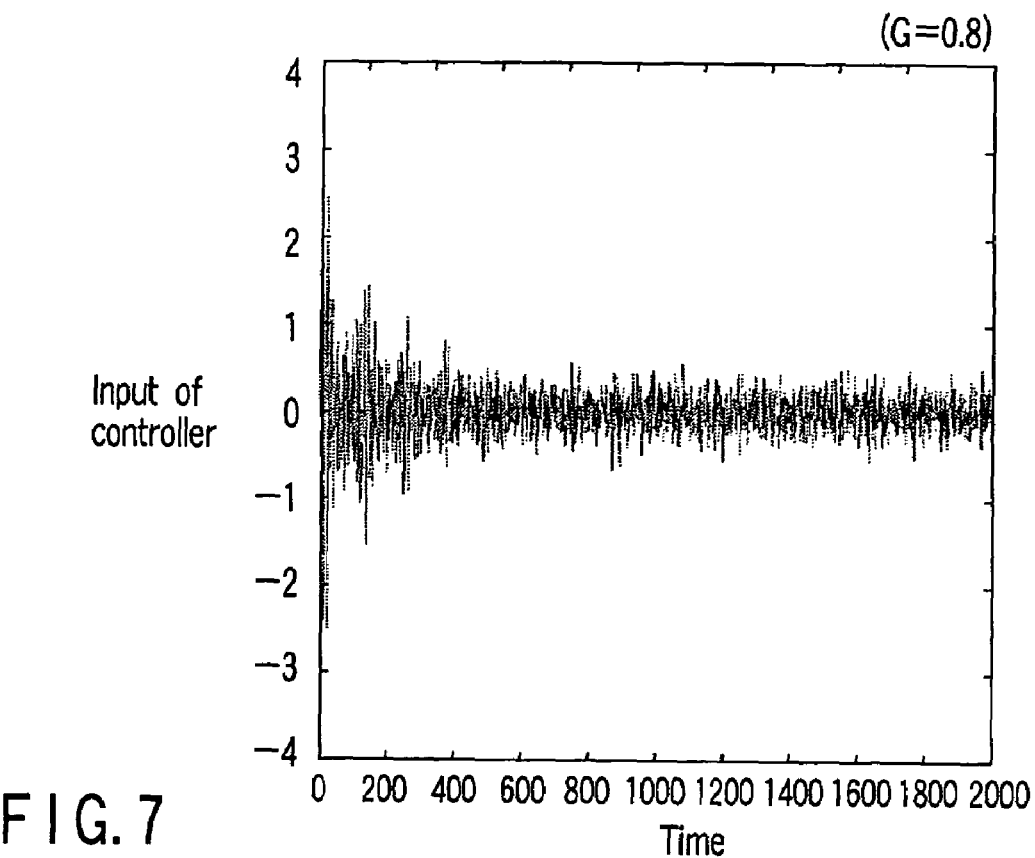

When the gain constant G is 0.1, the convergence speed becomes relatively low as shown FIG. 4. When the gain constant G is 0.3 as shown in FIG. 5, the convergence speed is improved. When the gain constant G is 0.6 as shown in FIG. 6, the convergence speed is noticeably improved. However, when the gain constant G is 0.8 as shown in FIG. 7, the convergence speed is not improved but varies somewhat widely in a steady state. It is thus desirable that the gain constant G should fall within a range of 0.3 through 0.6.

In the self-servo writing method using the head positioning system according to the present embodiment, when servo data is written to a disk based on the preceding servo data recorded on the disk, the RRO component that is synchronized with the rotation of the disk can effectively be inhibited from increasing. Specifically, the RRO component can be deleted from the input value 250 of the controller 200. Consequently, the distortion of old servo data in the radial direction of the disk can inhibit RRO, which has an influence on the distortion of the subsequent servo data, from increasing.

The head positioning system according to the present embodiment is applied to the self-servo writing operation in the hard disk drive. However, it can be applied to, for example, a process of manufacturing a master of a digital versatile disk (DVD).

According to the head positioning system described above, a correction value is corrected by feeding back the RRO after the FF correction to inhibit the RRO from increasing effectively and thus correct the distortion of servo data with high efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

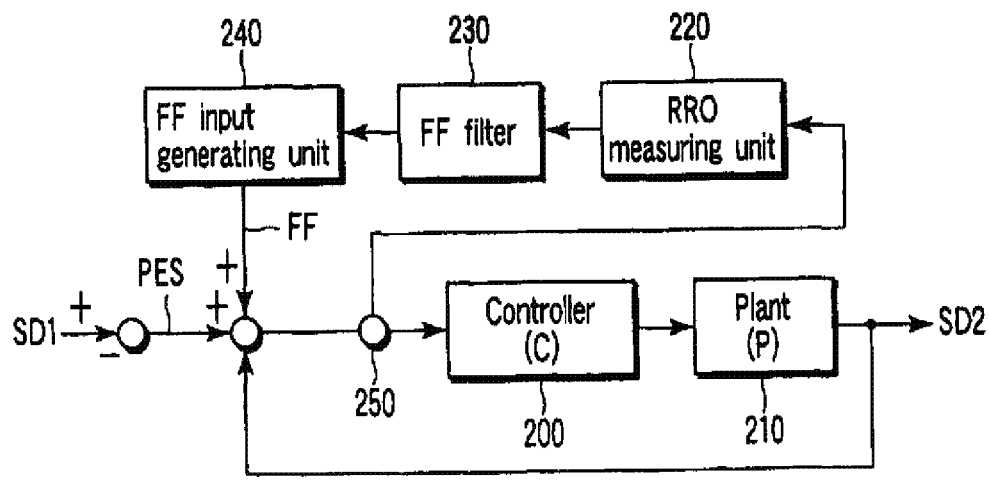

What is claimed is:

1. A head positioning system, comprising:
a positioning unit that positions a head in a target position on a disk medium that has a plurality of servo sectors containing servo data that is written to read from the disk medium, and the disk medium is rotating;
a unit that senses a position error (PES) of the head relative to the target position;
a controller that outputs an amount of control operation of the positioning unit based on the position error in a feedback control system;
a repeatable run-out (RRO) measuring unit that measures an RRO residual component from the input value of the controller;
a linear filter operating unit that is associated with the inverse function of the sensitivity function of a feedback control system, the sensitivity function being a transfer function $1/(1+G)$, where G is an open-loop transfer function of the feedback control system, and computes correction values from the measurement results of the RRO measuring unit; and
a feed forward input generating unit which outputs a correction value (FF) for each of the servo sectors,
wherein a result of addition of the position error (PES) and the correction value (FF) from the feed forward input generating unit is regarded as an input value of the controller,
the RRO measuring unit has memories that are equal in number to the servo sectors and measures an RRO residual component from the input value of the controller, and
the measurement is given by the following equation:

$$RRO(k)=RRO(k)+G\times(PES(t)+FF(k)),$$

where k is the number of a servo sector, RRO(k) is a result of measurement of RRO corresponding to the servo sector k, which is stored in a memory of the RRO measuring unit, PES(t) is a position error (PES) including distortion of the servo data, FF(k) is a correction value output from the feed forward input generating unit and corresponding to the servo sector k, and G is a gain constant of 0 through 1.

2. The head positioning system according to claim 1, wherein the RRO(k) in the right term of the equation represents a value measured when old servo data is written.

3. A disk drive, comprising:
a head that reads/writes servo data from/to a disk medium that has a plurality of servo sectors and is rotating;
a unit that supplies the head with servo data to be recorded on the disk medium;
a positioning unit that positions the head in a target position on the disk medium;
a unit that senses a position error (PES) of the head relative to the target position;
a controller that outputs an amount of control operation of the positioning unit based on the position error;
a repeatable run-out (RRO) measuring unit that measures an RRO residual component from the input value of the controller;
a linear filter operating unit that is associated with the inverse function of the sensitivity function of a feedback control system, the sensitivity function being a transfer function $1/(1+G)$ where G is an open-loop transfer function of the feedback control system, and computes correction values from the measurement results of the RRO measuring unit; and
a feed forward input generating unit that outputs a correction value (FF) for each of the servo sectors, wherein a result of addition of the position error (PES) and the correction value (FF) from the feed forward input generating unit is regarded as an input value of the controller, and the RRO measuring unit has memories that are equal in number to the servo sectors and measures an RRO residual component from the input value of the controller, and the measurement is given by the following equation:

$$RRO(k)=RRO(k)+G\times(PES(t)+FF(k)),$$

where k is the number of a servo sector, RRO(k) is a result of measurement of RRO corresponding to the servo sector k, which is stored in a memory of the RRO measuring unit, PES(t) is a position error (PES) including distortion of servo data, FF(k) is a correction value output from the feed forward input generating unit and corresponding to the servo sector k, and G is a gain constant of 0 through 1.

4. The disk drive according to claim 3, wherein the RRO(k) in the right term of the equation represents a value measured when old servo data is written.

5. A method of servo writing for a disk drive including a head that reads/writes data from/to a disk medium that has a plurality of servo sectors and is rotating, the method comprising:

reading servo data from the disk medium by the head;

performing a positioning operation including a correcting operation to eliminate a position error component from a position error; and writing the servo data to a target position on the disk medium by the head;

measuring a repeatable run-out (RRO) residual component from an input value obtained by the positioning operation;

performing a linear filter operation that is associated with an inverse function of a sensitivity function of the positioning operation, the sensitivity function being a transfer function 1/(1+G) where G is an open-loop transfer function of a feedback control system, and computes correction values from the measurement results of the RRO measuring; and generating a feed forward input which is the correction values for each of the servo sectors, wherein a result of addition of the position error (PES) and the correction value (FF) is regarded as an input value, and the RRO measuring an RRO residual component front the input value, and the measurement is given by the following equation:

$$RRO(k)=RRO(k)+G\times(PES(t)+FF(k)),$$

where k is the number of a servo sector, RRO(k) is a result of measurement of RRO corresponding to the servo sector k, PES(t) is a position error (PES) including distortion of servo data, FF(k) is the correction value and corresponding to the servo sector k, and G is a gain constant of 0 through 1.

6. The method according to claim 5, wherein the RRO(k) in the right term of the equation represents a value measured when old servo data is written.

* * * * *

UNITED STATES PATENT AND TRADEMARK OFFICE
CERTIFICATE OF CORRECTION

| | |
|---|---|
| PATENT NO. | : 7,061,710 B2 |
| APPLICATION NO. | : 10/976177 |
| DATED | : June 13, 2006 |
| INVENTOR(S) | : Iwashiro |

It is certified that error appears in the above-identified patent and that said Letters Patent is hereby corrected as shown below:

The title page, showing an illustrative figure, should be deleted and substitute therefor the attached title page.

Delete drawing sheet 1, and substitute therefor the drawing sheet, consisting of FIG. 2 as shown on the attached pages.

Signed and Sealed this

Eighth Day of September, 2009

David J. Kappos
*Director of the United States Patent and Trademark Office*

(12) United States Patent
Iwashiro

(10) Patent No.: US 7,061,710 B2
(45) Date of Patent: Jun. 13, 2006

(54) METHOD AND APPARATUS FOR POSITIONING A HEAD IN A DISK DRIVE WITH SERVO WRITING FUNCTION

(75) Inventor: Masafumi Iwashiro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/976,177

(22) Filed: Oct. 29, 2004

(65) Prior Publication Data
US 2005/0094307 A1 May 5, 2005

(30) Foreign Application Priority Data
Oct. 30, 2003 (JP) ............................. 2003-371094

(51) Int. Cl.
G11B 5/596 (2006.01)
(52) U.S. Cl. ................................. 360/77.04
(58) Field of Classification Search ............. 360/77.04
See application file for complete search history.

(56) References Cited
U.S. PATENT DOCUMENTS

| | | | |
|---|---|---|---|
| 5,585,976 A | 12/1996 | Pham | |
| 5,659,436 A | 8/1997 | Yarmchuk et al. | |
| 5,854,722 A | 12/1998 | Cunningham et al. | |
| 6,411,461 B1 | 6/2002 | Szita | |
| 6,487,035 B1 | 11/2002 | Liu et al. | |
| 6,600,621 B1 * | 7/2003 | Yarmchuk | 360/75 |
| 6,608,731 B1 * | 8/2003 | Szita | 360/75 |

FOREIGN PATENT DOCUMENTS

| | | |
|---|---|---|
| JP | 8-212733 | 8/1996 |
| JP | 2003-188701 A | 7/2003 |

OTHER PUBLICATIONS

Australian Search Report dated Jun. 29, 2005 for Singapore Appln. No. 200406501-7.

* cited by examiner

Primary Examiner—Wayne Young
Assistant Examiner—Jason Olson
(74) Attorney, Agent, or Firm—Pillsbury Winthrop Shaw Pittman, LLP

(57) ABSTRACT

A disk drive includes a head positioning system having a feed forward control system to correct a RRO component. The feed forward control system has a measuring unit which feeds back the last correction value obtained from the input value of the controller and measures a RRO component generated after the correction and an FF filter which computes a correction value to correct the RRO component.

6 Claims, 4 Drawing Sheets

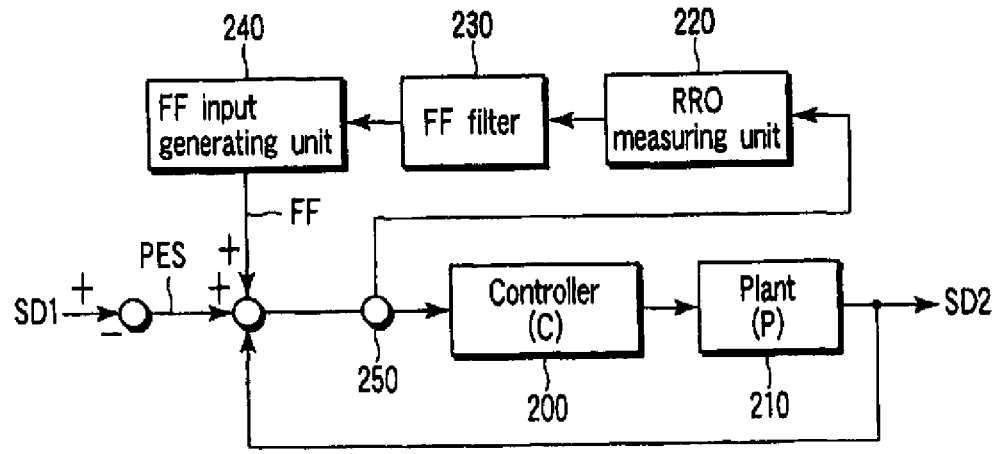

UNITED STATES PATENT AND TRADEMARK OFFICE
CERTIFICATE OF CORRECTION

PATENT NO. : 7,061,710 B2
APPLICATION NO. : 10/976177
DATED : June 13, 2006
INVENTOR(S) : Iwashiro It is certified that error appears in the above-identified patent and that said Letters Patent is hereby corrected as shown below:

Figure 2